(12) United States Patent
Devitt-Carolan et al.

(10) Patent No.: US 10,417,010 B2
(45) Date of Patent: Sep. 17, 2019

(54) DISK SECTOR BASED REMOTE STORAGE BOOTING

(71) Applicant: HEWLETT-PACKARD DEVELOPMENT COMPANY, L.P., Houston, TX (US)

(72) Inventors: Taram Sierra Devitt-Carolan, Palo Alto, CA (US); Rick Bramley, Mansfield, MA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 162 days.

(21) Appl. No.: 15/517,702

(22) PCT Filed: Dec. 1, 2014

(86) PCT No.: PCT/US2014/067876
§ 371 (c)(1),
(2) Date: Apr. 7, 2017

(87) PCT Pub. No.: WO2016/089343
PCT Pub. Date: Jun. 9, 2016

(65) Prior Publication Data
US 2017/0308386 A1 Oct. 26, 2017

(51) Int. Cl.
*G06F 9/44* (2018.01)
*G06F 9/4401* (2018.01)
*G06F 9/455* (2018.01)

(52) U.S. Cl.
CPC .......... *G06F 9/4416* (2013.01); *G06F 9/4408* (2013.01); *G06F 9/45558* (2013.01); *G06F 9/44* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 5,842,011 A | 11/1998 | Basu | |
| 6,463,530 B1 | 10/2002 | Sposato | |
| 7,246,200 B1 * | 7/2007 | van Rietschote | G06F 9/4403 709/220 |
| 7,406,591 B2 | 7/2008 | Rothman et al. | |
| 8,706,947 B1 * | 4/2014 | Vincent | G06F 9/5077 711/206 |
| 2005/0160256 A1 | 7/2005 | Huang et al. | |
| 2005/0289218 A1 * | 12/2005 | Rothman | G06F 3/0605 709/203 |
| 2008/0244096 A1 | 10/2008 | Springfield et al. | |

(Continued)

OTHER PUBLICATIONS

"Desktop Central—Free Windows Admin Tools," ManageEngine, 2014, pp. 1-4, Zoho Corp.

(Continued)

*Primary Examiner* — Danny Chan
(74) *Attorney, Agent, or Firm* — HPI Patent Development

(57) ABSTRACT

Examples allow booting from remote storage. In one example, a storage disk includes disk sectors which can be checked for data to boot a virtual machine application. If the disk sector does not include the data, the data can be downloaded from a remote storage unit. The data can then be stored on the appropriate disk sector of the storage disk for use by the application.

14 Claims, 5 Drawing Sheets

(56) References Cited

U.S. PATENT DOCUMENTS

| | | | |
|---|---|---|---|
| 2011/0145534 A1* | 6/2011 | Factor | G06F 8/60 |
| | | | 711/170 |
| 2011/0246626 A1 | 10/2011 | Peterson et al. | |
| 2011/0246988 A1* | 10/2011 | Hui | G06F 9/45558 |
| | | | 718/1 |
| 2012/0166699 A1* | 6/2012 | Kumar | G06F 13/385 |
| | | | 710/306 |
| 2015/0277791 A1* | 10/2015 | Li | G06F 3/0689 |
| | | | 711/114 |

OTHER PUBLICATIONS

Admin, "Cloudboot Hypervisor Servers," Dec. 26, 2013, 1 page, Atlassian Confluence 5.2.3.
Cisco Network Boot Installation and Configuration Guide, Release 2.1: Chapter 1—Product Overview, 2014, pp. 1-5, Cisco

* cited by examiner

DISK SECTOR BASED REMOTE STORAGE BOOTING

BACKGROUND

Computers can be used to machine-readable instructions that direct a processor of the computer to perform specific operations. The processor can be instructed to run system software, such as for example an operating system (OS), device drivers, etc. Such system software can, for example, be designed to directly operate hardware of the computer and/or to provide a platform for running other software on the computer. The processor can further be instructed to run application software, such as for example a word processor, spreadsheet program, video games, web browser, etc. Such application software can, for example, use the computer system to perform special functions or provide entertainment functions beyond the basic ration of the computer itself.

DETAILED DESCRIPTION

Figure 1:
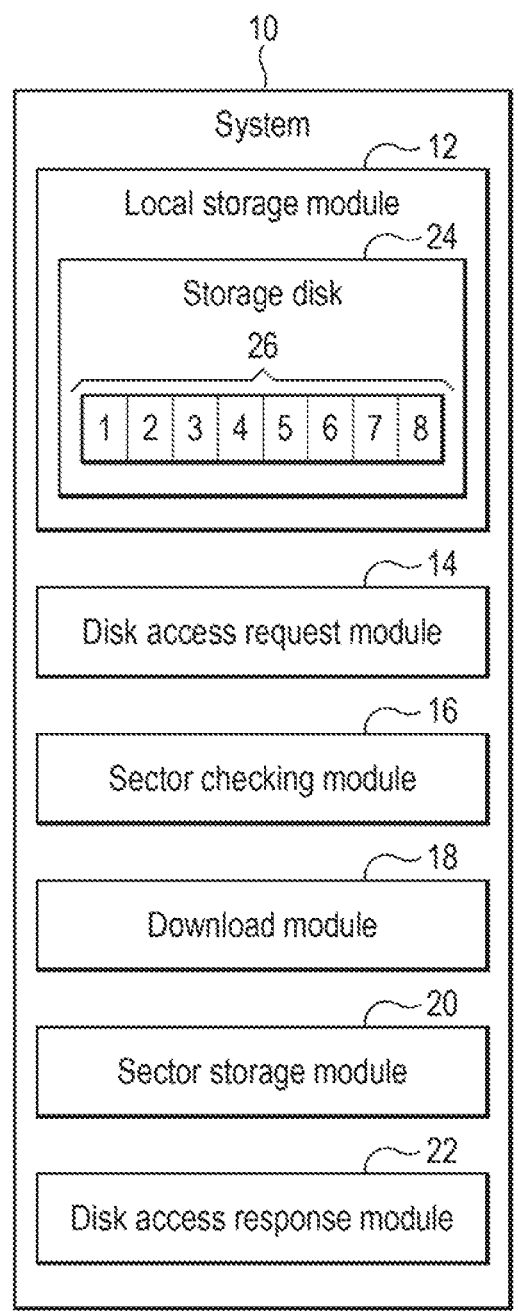
FIG. 1 illustrates a system to allow boozing from remote storage, according to an example.

As described above, software can be used to instruct a computer processor to perform computer operations. Such software is often stored on a local storage medium interfaced with a local processor of the computer. For example, such software can be stored and accessible from a hard drive connected to the processor via an internal computer bus. System software, such as a machine's operating system and device drivers, are typically stored on local storage due to the arrangements relatively quick access speed compared to remote storage. However, there are often situations where it is desirable to allow a machine to boot from a remote source (e.g., a server-hosted disk image) rather than from local storage. For example, in an enterprise environment, the use of server-hosted disk images can facilitate various aspects of compute administration, such as security, maintenance, support, system recovery, etc.

Various attempts have been made to achieve the advantages of remote booting described above. For example, some machines are designed to allow remote booting via a network interface (e.g., LAN, WAN, etc.). Examples of such machines can include certain cloud computing solutions, such as network PCs and thin clients. Such machines can, for example, include a hard disk for use as a temporary cache (rather than to permanently store data). Although such cloud computing solutions can be used to facilitate various aspects of computer administration these solutions often suffer from decreased performance due to their reliance on a continuous network connection to operate. Moreover, such solutions often require that an entire local disk image be downloaded before the machine is usable. Depending on the network speed and the disk image size (e.g., some disk images can be hundreds of gigabytes or larger in size), the time to download the complete disk image to local storage can result in an unacceptable delay.

With reference to an example implementation of the present disclosure, a computer can be instructed to check, at a disk-sector level, whether data requested to run a Virtual Machine (VM) application (e.g., an OS) is already stored on a specific disk-sector of a local storage module. If the data is not already stored in the disk sector, the system is instructed to retrieve the data from a remote storage unit and store the retrieved data to the appropriate disk sector of the local storage module. If the data is already stored in the appropriate disk sector, then the data is not retrieved from the remote storage unit and is run directly from the local storage module. The data can remain stored in the disk sector until the computer is rebooted or at another suitable time.

It is appreciated that the present disclosure can address various disadvantages of existing solutions. For example, with respect to some implementations, disk content is fetched only on-demand and therefore network usage can be reduced as many disk images have content that is rarely or never used in a traditional boot and runtime process. Moreover, with respect to some implementations, a user can start using a disk image immediately with computer performance continually improving the longer the image is used. Other advantages of the solutions presented herein will be apparent upon review of the description and figures.

FIG. 1 illustrates a system 10 according to an example. As described in further detail below, system 10 includes: (1) a local storage module 12 to locally store data of system 10; (2) a disk access request module 14 to receive a disk read request for data to boot a VM application; (3) a sector checking module 16 to check whether the requested data is locally stored on disk sector requested by the disk read request; (4) a download module 18 to download from a remote storage unit, the requested data when it is determined that the requested data is not stored on the requested disk sector; (5) a sector storage module 20 to store the downloaded requested data on the requested disk sector; and (6) a disk access response module 22 to provide the requested data to disk access request module 14. Each module of system 10 will be described in further detail below.

System 10 can, for example, be in the form of an all-in-one computer (e.g., a desktop PC or a laptop), a server, tablet, smartphone, wearable computing device, gaming device, workstation, thin client, retail point of sale device, scientific instrument, other suitable computer appliance, or any suitable combination thereof. System 10 is described using functional modules that can, for example, be operative to execute one or more steps of methods or other operations described herein. As used herein, the term "module" refers to a combination of hardware (e.g., a processor such as an integrated circuit or other circuitry) and software (e.g., machine- or processor-executable instructions, commands, or code such as firmware, programming, or object code). As used herein, the term "software" is intended to refer to machine-readable instructions. A combination of hardware and software can include hardware only (i.e., a hardware element with no software elements), software hosted at hardware (e.g., software that is stored at a memory and executed or interpreted at a processor), or at hardware and software hosted at hardware. Additionally, as used herein, the singular forms "a," "an," and "the" include plural referents unless the context clearly dictates otherwise. Thus, for example, the term "module" is intended to mean one or more modules or a combination of modules. Each module of system 10 can include one or m machine-readable storage mediums and one or more computer processors. As but one example, software that provides the functionality of modules on system 10 can be stored on a memory of a computer to be executed by a processor of the computer.

Suitable computer processors for use with system 10 can, for example, be in the form of a central processing unit (CPU), a semiconductor-based microprocessor, a digital signal processor (DSP) such as a digital image processing unit, other hardware devices or processing elements suitable to retrieve and execute instructions stored in a computer-readable medium, or suitable combinations thereof. Suitable processors can, for example, include single or multiple cores on a chip, multiple cores across multiple chips, multiple cores across multiple devices, or suitable combinations thereof. Suitable processors can be functional to fetch, decode, and execute instructions as described herein. As an alternative or in addition to retrieving and executing instructions, suitable processors can, for example, include at least one integrated circuit (IC), other control logic, other electronic circuits, or suitable combination thereof that include a number of electronic components for performing the functionality of instructions stored on a computer-readable medium. Suitable processors can, for example, be implemented across multiple processing units and instructions may be implemented by different processing units in different areas of computing system.

Suitable machine-readable storage mediums can, for example, be in the form of non-transitory storage mediums. Such mediums can, for example, be in the form of electronic, magnetic, optical, or other physical storage mediums to store information, such as computer instructions. Suitable computer instructions can, for example, be machine-readable instructions executable by a processor of system 10 and can be operative to perform one or more functions described herein, such as those described above with respect to the method of FIG. 3.

Storage mediums can, for example, be housed within the same housing as processors, such as for example within a common tower case, laptop housing, rack system, etc. In some implementations, the mediums and processors can be housed in different housings. As used herein, the term "machine-readable storage medium" can, for example, include Random Access Memory (RAM), flash memory, a storage drive (e.g., a hard disk), any type of storage disc (e.g., a Compact Disc Read Only Memory (CD-ROM), any other type of compact disc, a DVD, etc.), and the like, or a combination thereof. In some implementations, mediums can correspond to a memory including a main memory, such as a Random Access Memory (RAM), where software may reside during runtime, and a secondary memory. The secondary memory can, for example, include a nonvolatile memory where a copy of machine-readable instructions are stored. It is appreciated that instructions and data can be stored on separate machine-readable storage mediums. For purposes of clarity, multiple storage mediums can be identified as a single medium and multiple processors can be identified as a single processor.

As described above, local storage module 12 of system 10 is used to locally store data of system 10. In the implementation of system 10 illustrated in FIG. 1, local storage module 12 includes a storage disk 24 subdivided into a plurality of disk sectors 26. Disk sectors 26, can, for example, be in the form of a subdivision of a track on a magnetic disk or optical disc. Although the term "sector" may generally refer to a portion of a circular disk between a center, two radii and a corresponding arc, it is appreciated that as used herein, the term is intended to refer to any suitable geometric subdivision of a storage medium and can, for example, include non-"sector" shaped subdivisions.

For purposes of illustration, FIG. 1 depicts storage disk 24 as being subdivided into only eight disk sectors 26. However, it is appreciated that in many implementations, storage disk 24 will be divided into a significantly larger number of disk sectors. The size of the sector can, for example, be chosen as a manageable size to facilitate parallel downloading of multiple sectors concurrently (e.g., at least at initial startup). For example, in some implementations, storage disk 24 is in the form of a one-gigabyte disk that is subdivided into over two-million 512-byte disk sectors. In another implementation, storage disk 24 is in the form of a one-terabyte disk that is subdivided into over two-billion 512-byte disk sectors. In some implementations, storage disk 24 is subdivided into disk sectors having a different sector size. For example, in some implementations, storage disk 24 is subdivided into disk sectors of 4096 bytes. It is appreciated that any suitable sizes of disk sector and storage disk can be used. In some implementations, storage disk 24 is subdivided into disk sectors of different sizes. For example, a first disk sector (or a first plurality of disk sectors) can be 512 bytes and a second disk sector (or a second plurality of disk sectors) can be 4096 bytes. For simplicity of description, only storage disks with equal sized disk sectors are described in the examples provided herein. However, it is appreciated that the disclosure provided herein is compatible or adaptable for use with storage disks 24 having disk sectors of different sizes.

As described above, disk access request module 14 of system 10 is operative to receive a disk read request for data to boot a VM application. As used herein, the term "VM application" can, for example, refer to an application such as an OS. The term may further generally refer to other data for booting a computer system, such as for example a boot disk-image. As used herein, the term "boot" or "booting" is intended to refer to an initialization of a computer system. Such booting can be considered complete when the system's normal, operative, runtime environment is attained. In some implementations, booting is complete when an OS is loaded and awaiting user input (e.g., a sign-in screen or blank desktop). Booting of system 10 can, for example, be performed by a boot loader loaded into main memory from persistent memory of system 10. It is appreciated that in some implementations, multiple-stage boot loaders are used, during which several programs of increasing complexity can, for example, be loaded one after the other.

As used herein, the term "storage disk" can, for example, refer to any suitable non-transitory storage medium and is not limited a specific storage structure. For example, in some implementations, the storage disk can be in the form of a hard disk drive (HDD) used for storing and retrieving digital information using rapidly rotating disks coated with magnetic material. In some implementations, the storage disk can be in the form of a solid state drive (SSD), which can, for example, use integrated circuit assemblies as memory to store data persistently, and may not include an actual disk. As another example, in some implementations, the term "storage disk" can refer to a virtualized disk emulated in a virtual computer system, it is appreciated that other forms of storage disks can be used with the present disclosure.

The disk read request received by disk access request module 18 can, for example, be requested from an application running on system 10, such as, for example, a hypervisor. As used herein, the terms "hypervisor" is intended to refer to a piece of computer software, firmware or hardware that creates and runs virtual machines. In some implementations, the hypervisor is a type of bootloader for system 10. In some implementations, the hypervisor is a separate application called by the bootloader. The hypervisor can, for example, present a guest operating system with a virtual operating platform and manage the execution of such guest operating systems. Hypervisors for use with the systems described herein can, for example, be in the form of Type 1 (or native, bare metal) hypervisors that run directly on host hardware to control the hardware and to manage guest operating systems. One or more guest operating-system can be run on a second level above the hypervisor. Hypervisors for use with the systems described herein can, as another example, be in the form of Type 2 (or hosted) hypervisors that run within a conventional operating-system environment. With the hypervisor layer as a distinct second software level, one or more guest operating-systems can be run at a third level above the hardware. The hypervisor can, for example, include a disk information prior to starting the VM application. As one example, when defining the VM application to boot, the hypervisor can for example include a sector map to determine whether a specific disk sector is assigned to store data to boot the VM application. As another example, when defining the VM application to boot, the hypervisor can includes a disk definition (e.g., size, type, addressing, etc).

In some implementations, a hypervisor running on system 10 can provide disk access request module 14 of system 10 with a disk read request for data to boot a VM OS. The disk read request can, in some implementations, identify a disk sector address for a requested disk sector. Any suitable disk sector addressing identification scheme can be used with the disk read request. For example, in some implementations, the disk read request can identify a given disk sector address of storage disk 24 to use in booting the VM OS. It is appreciated that this disk sector can be requested by the hypervisor, for example, to initiate a booting process or to continue a booting process. For example, in some implementations, disk access request module may receive the disk read request after the VM application has already begun to boot.

In some implementations, disk access request module 14 can interface with a virtual disk of system 10 for file input/output (I/O) operations. The virtual disk can, for example, be defined as a local resource which is empty but matches a remote resource. For example, a virtual disk can be defined as a 100-Gb capacity storage drive to a match a 100-Gb capacity storage disk of the remote storage unit. In some implementations, a virtual disk controller can be used to trap reads and writes by the VM application and take action accordingly.

In some implementations, disk access request module 14 is configured to schedule downloads of additional data even if such data is not requested by an application. For example, disk access request module 14 can determine that, based on historical usage, a web browser will likely be opened during use of the computer and will be instructed to automatically download data for operation of the web browser in the background so that it is ready before an operate attempts to open the web browser. Such "smart fetching" can, for example, leverage information from a scheduler about load and connectivity to determine when is the best time to fetch data. In some implementations, such smart fetching can be based on available time and resources and can, for example, be performed by an agent running in the OS. For example, a secondary agent process within a hypervisor space can be used to construct a locally defined virtual disk based on what sectors have not been requested yet and based on a smart schedule so as not to conflict with other resource requirements by a guest domain or hypervisor.

As described above, sector checking module 16 of system 10 is operative to check whether the requested data is locally stored on the requested disk sector. Data can, for example, be locally stored on the requested disk sector if it is present on the disk sector because: (1) it was previously downloaded or otherwise retrieved from a remote source, (2) it was not in the list of data to be fetched (e.g., new data added after fetching has begun), and/or (3) it was locally written to the disk sector without being downloaded from the remote source. One example of (3) can include a situation in which a file is deleted after fetching has started. The file entry in the file table can, for example, be deleted and a new file can be created and the content written to the same location on disk. As a result, a first action for a specific sector address is a write although it is expected to be fetched on a read.

As described in further detail below with respect to FIG. 2, sector checking module 16 can review a sector map to determine whether a specific disk sector 26 on storage disk 24 is assigned to store data to boot the VM application. The sector map, can for example, be in the form of a bitmap index, and an initial bitmap index can be provided to sector checking module 16 when the VM application is first booted.

In some implementations, sector checking module 16 can further check the requested disk sector for errors using an Error Correcting Code (ECC) or other suitable technique. In such an implementation, if an error is detected in data stored in the disk sector, sector checking module 16 can, in some implementations, be instructed to operate as if relevant data is not stored in the disk sector. In some implementations, sector checking module 16 is able to proceed with operations unless an error level of the disk sector passes an error threshold. The error threshold can, for example, be a fixed or dynamic value determined by sector checking module 16, another module of system 10, an administrator, or other source.

As described above, download module 18 is to download, from a remote storage unit, data requested from disk access request module 14 when it is determined that the requested data is not stored on the requested disk sector. In some implementations, download module 18 is to download using a network connection and in accordance with network protocols. The remote storage unit can, for example, be accessible by computing device over a wide-area network (WAN) or local-area network (LAN) connection. It is appreciated that any suitable networking download protocol can be used by download module 18 to download data from the remote storage unit. For example, in some implementations, download module 18 is to download data from a remote storage unit using TCP/IP protocols. In some implementations, download module 18 is to download data from a remote storage unit using FTP, SFTP, HTTP, BitTorrent, rsync, or another suitable protocol In some implementations, download module 18 is to download data from a remote storage unit using a suitable UDP protocol.

It is appreciated that the remote storage unit can be any suitable form of storage medium, such as for example, any suitable form of storage medium described herein with respect to FIG. 1. In some implementations, the remote storage unit is a storage module of a dedicated server housed in a data center and accessible to system 10 over the internet or other network. In some implementations, the remote storage unit can be a storage module of is end-user computer, such as a laptop or desktop computer.

Although the use of download module 18 to satisfy a read request by downloading data from a remote storage unit may be expected to result in an initial read delay compared to locally stored data, there are situations in which the delay may be acceptable or otherwise not noticeable. For example, certain implementations of system 10 are able to pause or slow down the loading of the VM application such that any slowness or network delay is substantially imperceptible to a user. Moreover, as described herein, as more data is stored to run the VM application, less data needs to be downloaded from the remote storage unit. Eventually the entire VM application will be stored on the local storage disk.

As described above, sector storage module 20 of system 10 is to store the data downloaded using the download module 18 on the disk sector requested by disk access request module 14. In some implementations, sector storage module 20 can store data onto the requested disk sector using any suitable disk writing operation. In some implementations, sector storage module 20 can confirm that the data was successfully stored on the disk sector by checking the disk sector for errors using using an Error Correcting Code (ECC) or other suitable technique.

As described above, disk access response module 22 of system 10 is to provide the data requested by disk access request module 14 to disk access request module 14. Disk access response module 22 is to provide the requested data to the disk access request module without downloading the requested data when it is determined by the sector checking module that the requested data is locally stored on the requested disk sector. For example, in some situations the data may have already been stored on the disk sector by sector storage module 20 or may have been previously stored on system 10 by an administrator or another source.

It is appreciated that in system 10, there will be some amount of relative delay in read requests where the sector on local storage disk 24 has not yet been populated with data. Such delay can for example, be caused by the processing overhead and network delay to access and retrieve the data. However, this delay will only occur for sectors that have not already been retrieved from the remote storage unit. After the data for the sector has been retrieved, any such delay will quickly disappear because the sector data is located on the local disk.

Figure 2:
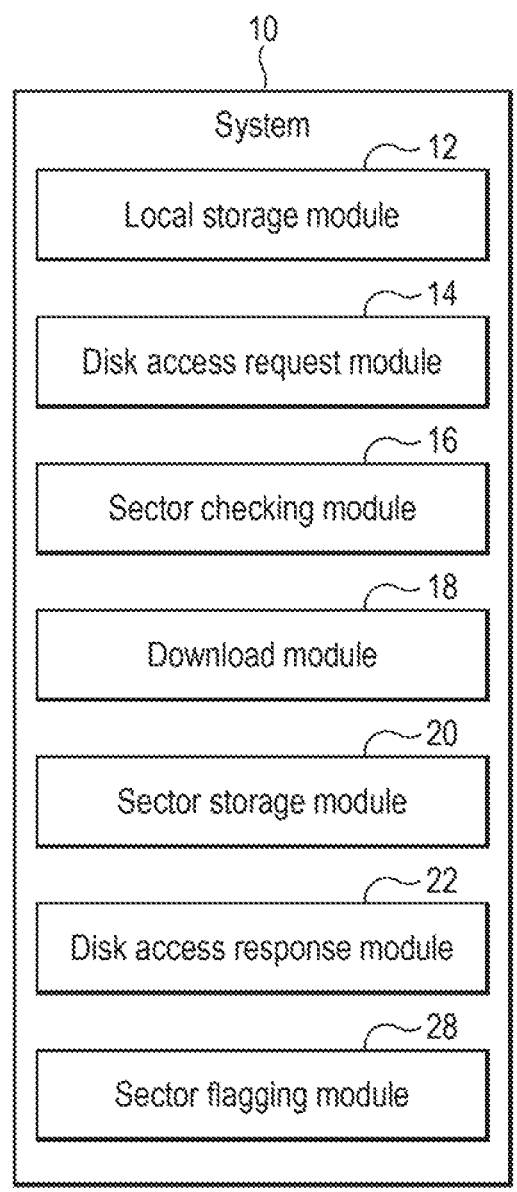
FIG. 2 illustrates a system to allot booting from remote storage, according to another example.

FIG. 2 illustrates a system that includes additional aspects compared to the system illustrated in FIG. 1. For ease of description, the same reference number (system 10) is used to refer to both systems and common reference numbers are used to refer to common modules local storage module 12). The specific example provided below is not intended to suggest specific requirements or functionality of system 10 or that system 10 is incompatible with the additional aspects. Certain aspects of system 10 of FIG. 1, such as for example storage disk 24 and disk sectors 26, are not depicted in system 10 of FIG. 2 to avoid redundancy. However, it is appreciated that one or more aspects of the example system of FIG. 1 described above can be implemented in the system of FIG. 2 or another system described herein (and vice-versa).

System 10 includes a sector flagging module 28 to flag requested sector as storing the requested data after the requested data is stored on the requested disk sector. In some implementations, sector flagging module 28 is to flag, using a sector map, whether disk sectors on storage disk 24 store data to boot a VM application. The sector map can, for example, be in the form of a bitmap index, and an initial bitmap index can be provided when the VM application is first booted. In some implementations, the initial bitmap index is to indicate that no disk sectors on the storage disk 24 store data to boot the VM application. In some implementations, the bitmap index indicates that certain disk sectors on storage disk 24 are assigned to store data to boot the VM application. The initial bitmap index can, for example, be based on file system level knowledge. In some implementations, unused sectors are marked in the network image according to a partition and file table so as to avoid downloading these to the local platform and instead marking them as local in the drive map. In implementations where sector flagging module 28 is used, sector checking module 16 can be configured to check whether the requested disk sector is flagged as storing the requested data.

It is appreciated that certain modules described herein or otherwise can, in some implementations, share hardware, software, or data with other modules. As but one example, in some implementations, disk access response module 22 and sector flagging module 28 can share a computer-readable medium, whereas in some implementations, these modules can use separate mediums. It is appreciated that any modules can share hardware, software, or data with any other module in order to achieve their respective objectives.

An example implementation of the above system is described below for illustration. The specific example provided below is not intended to suggest specific requirements or functionality of system 10. However, it is appreciated that one or more aspects of the example system described below can be implemented in another system described herein (and vice-versa). In this example implementation a hypervisor is used to manage the various functions of system 10 and can be booted before any other operating system of system 10. The hypervisor is in the form of software that is run directly on actual hardware of system 10. The hypervisor is further responsible for managing all of the processing units (e.g., CPUs), memory, interrupts, and drive image usage of a local machine. In this example implementation, the hypervisor provides a virtual machine (VM) definition, VM provisioning, virtual and real device access to guest OS's, and further allows real time processing within administrative domains to take action on events in the virtual guest OS's.

In this example implementation, each VM is defined locally by the hypervisor. This definition includes CPU access, memory allocation, hardware access (real and virtual) and virtual disk configuration. The hypervisor allows certain domains direct access to the hardware of the machine. This can, for example, allow for supporting images that are premade for a machine's particular device model and profile. This functionality further allows for no additional drivers or software to be downloaded to support the machine's hardware.

In this example implementation, the hypervisor can be used to create multiple domains among which the processing units, memory, interrupts, and drive images are allocated. For example, a high privilege control domain (e.g., dom0) can be created from which the creation and management of all other domains is handled. When each domain is created, the domain can be granted access by the hypervisor to a set of virtual devices controlled by the hypervisor and can, in some implementations, have direct access to physical devices. In this example implementation, the hypervisor can be used to maintain independent network connectivity while either sharing the network with each domain or leveraging network partitioning (as provided by certain network adapters).

In this example implementation, a virtual disk manager is interfaced with the hypervisor and is used to filter disk read and write requests from the hypervisor. The virtual disk manager can incorporate one or more aspects of system 10 described above, such as disk access request module 14, sector checking module 16, sector storage module 20, disk access response module 22, etc. For example, the virtual disk manager is used to receive a disk read request and sector address and is programmed to determine where to fetch and store the requested data. In some implementations, this read or write request is mapped to a real local disk partition or a real local disk image file which is hosted on the local disk itself. In this example implementation, all write requests go to a local resource and all read requests for an address that have not been requested yet in the lifespan of the VM (e.g., since reboot or another time period) are fetched from a remote resource via a download manager. The virtual disk manager is used to keep track of all sectors that have transitioned to a local sector (through a previous read or write). Any sector that is not already a local sector is considered to be a candidate to be read from the remote disk server upon a corresponding read request. Once the entire disk is populated with the real data from the server (or from local write requests), the remote disk server is no longer used until the system is rebooted (or after another time period, e.g., at the beginning of a given day). In some implementations, the virtual disk manager can be instructed to allow "copy on read" or "copy on write" functionality. For example, for each disk read and write request, the hypervisor can maintain or build a second copy of each piece of data.

In this example implementation, a download manager is interfaced with the hypervisor and servers as a companion resource to request and provide a specific sector of information from a remote disk resource in an efficient manner. The download manager can incorporate one or more aspects of system 10 described above, such as download module 18. The download manager can, for example, be designed to work closely with the virtual disk manager and provide remote data required by the virtual disk manager. In some implementations, the hypervisor is used to maintain independent network connectivity while either sharing the network with each domain or leveraging network partitioning (as provided by certain network adapters).

In this example implementation, a disk image hosting server is interfaced with the hypervisor and is used to provide content at a disk-sector level from hosted disk images. This transfer can be enabled using any suitable data transfer protocol. In this implementation, the disk image hosting server includes a processor configured to dissect a hosted image and extract individual sectors of data based on the requested sector address.

This example implementation can allow a computer to access and instantly boot an OS (or other VM application) from a network-based drive image that is located somewhere outside of the platform itself. This network-based drive image can be used to boot multiple platforms concurrently following this same configuration. The content of the network-based drive image is fetched only on demand and only data that is minimally required to support the local OS boot. The fetching occurs in real time based on sector level reads of the guest disk where the sectors were not previously read from or written to.

Figure 3:
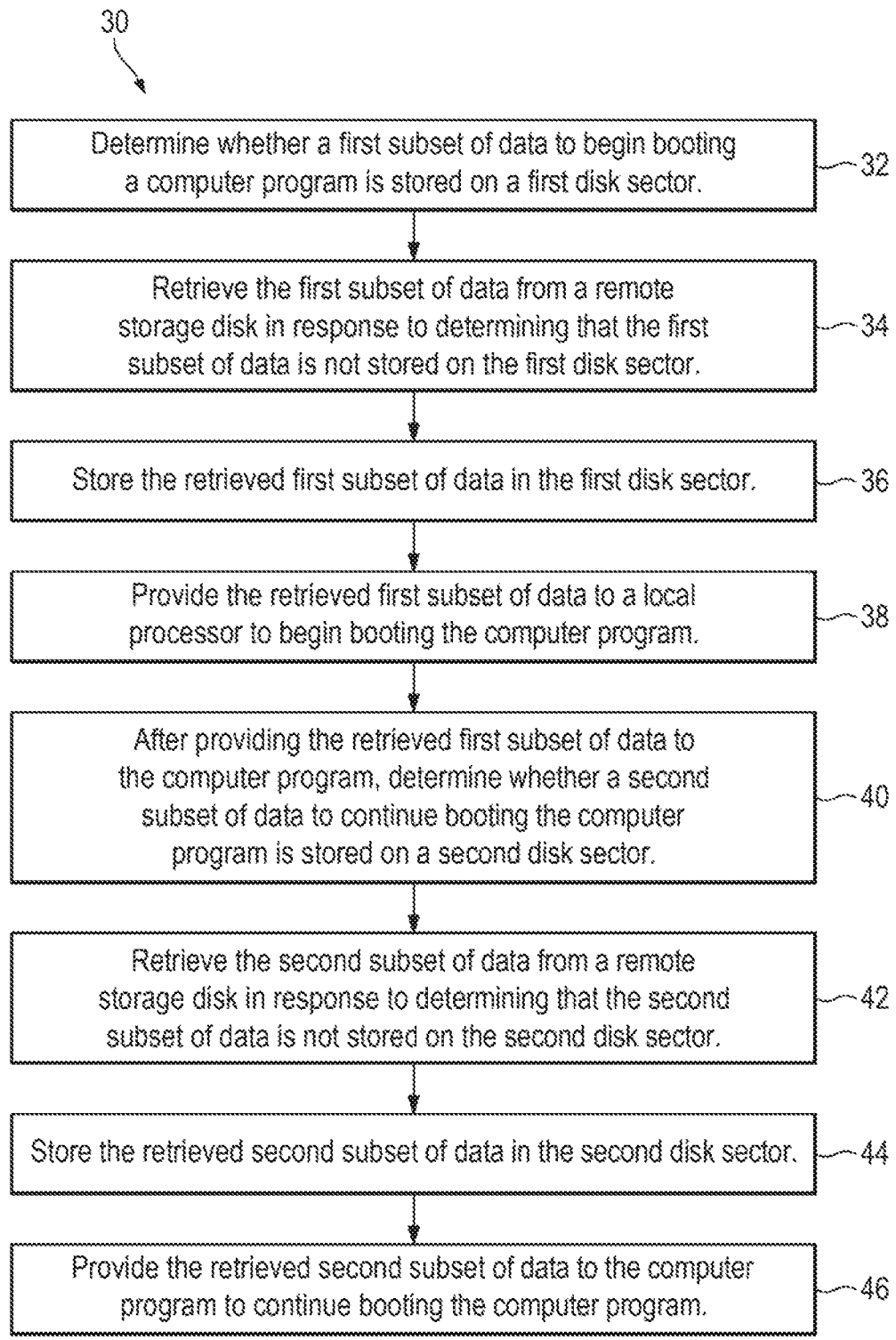
FIG. 3 illustrates a method that can enable a system to boot from remote storage, according to an example.

FIG. 3 is a flowchart for a method 30 of operating a system in accordance with the disclosure herein. The description of method 30 and its component steps make reference to elements of system 10 and an example remote storage unit for illustration, however, it is appreciated that this method can be used or otherwise applicable for any suitable system or units. Moreover, references to system 10 and elements thereof are not intended to suggest specific requirements or functionality of system 10.

Method 30 includes a step 32 of determining whether a first subset of data to begin booting a computer program is stored on a disk sector 26 of local storage disk 24 of a computing device. The computer program referenced in step 32 can, for example, be a VM application as described above. The computing device referenced in step 32 can, for example, be in the form of an all-in-one computer (e.g., a desktop PC or a laptop), a server, or other suitable computer appliance. The determination referenced in step 32 can, for example, be performed by a virtual disk manager interfaced with a hypervisor and used to filter disk read and write requests from the hypervisor. It is appreciated that any suitable aspects of disk access request module 14 and sector checking module 16 of system 10 described above with respect to FIG. 1 can be applied to step 32 of method 30 and vice versa.

Method 30 includes a step 34 of retrieving the first subset of data from a remote storage disk when it is determined that the first subset of data is not stored on a disk sector 26 of local storage disk 24. As described above, this retrieval step can, for example be in the form of a download using a network connection and in accordance with network protocols, such as TCP/IP. The remote storage disk can, for example, be accessed over a wide-area network (WAN) or local-area network (LAN) connection. It is appreciated that any suitable aspects of sector checking module 16 and download module 18 of system 10 described above with respect to FIG. 1 can be applied to step 34 of method 30 and vice versa.

Method 30 includes a step 36 of storing the retrieved first subset of data in a disk sector 26 of local storage disk 24. It is appreciated that any suitable aspects of sector storage module 20 of system 10 described above with respect to FIG. 1 can be applied to step 36 of method 30 and vice versa.

Method 30 includes a step 38 of providing the retrieved first subset of data to a local processor of the computing device to begin booting the computer program. As described above, this providing step can, for example, be performed by a virtual disk manager interfaced with a hypervisor. It is appreciated that any suitable aspects of disk access response module 22 of system 10 described above with respect to FIG. 1 can be applied to step 38 of method 30 and vice versa.

Method 30 includes a step 40 of determining whether a second subset of data to continue booting the computer program is stored on a disk sector 26 of local storage disk 24. Step 40 can, for example, be performed after providing the retrieved first subset of data to the computer program. In some implementations, step 40 is performed before providing the retrieved first subset of data to the computer program. The determining process of step 40 can be performed identically, similarly, or differently than the determining process of step 32 described above. It is further appreciated that any suitable aspects of disk access request module 14 and sector checking module 16 of system 10 described above with respect to FIG. 1 can be applied to step 40 of method 30 and vice versa.

Method 30 includes a step 42 of retrieving the second subset of data from a remote storage disk when it is determined that the second subset of data is not stored on a disk sector 26 of local storage disk 24. The retrieval process of step 42 can be performed identically, similarly, or differently than the retrieval process of step 34 described above. It is appreciated that any suitable aspects of sector checking module 16 and download module 18 of system 10 described above with respect to FIG. 1 can be applied to step 42 of method 30 and vice versa.

Method 30 includes a step 44 of storing the retrieved second subset of data in a disk sector 26 of local storage disk 24. The storing process of step 44 can be performed similarly, or differently than the storing process of step 36 described above. It is appreciated that any suitable aspects of sector storage module 20 of system 10 described above with respect to FIG. 1 can be applied to step 44 of method 30 and vice versa.

Method 30 includes a step 46 of providing the retrieved second subset of data to the computer program to continue booting the computer program. The providing process of step 46 can be performed identically, similarly or differently than the providing process of step 38 described above. In some implementations, method 30 includes continuing to retrieve and store boot sectors until the entire computer program is stored on local storage disk 24. It is appreciated that any suitable aspects of disk access response module 22 of system 10 described above with respect to FIG. 1 can be applied to step 46 of method 30 and vice versa. It is further appreciated that steps of method 30 can be rearranged, supplemented, or approximated using greater or fewer steps. As but one example, in some implementations, step 38 of providing the retrieved first subset of data to the computer program to begin booting the computer program can occur before step 36 of storing the retrieved first subset of data in the first disk sector.

An example implementation of method 30 is provided below for illustration. It is appreciated that the specific example provided below is not intended to suggest specific requirements or functionality of system 10 or method 30. In this example, a startup sequence is identified for instant or near-instant booting a network image. The sequence includes a step of selecting a virtual disk to be used for a virtual machine. As described herein, the virtual disk can be stored on a device on a LAN, WAN, or another suitable retrieval location. For example, in some implementations, the virtual disk is stored on a cloud-based server.

In this example method, a hypervisor on a local machine is used to query remotely hosted virtual disk sector size and sector count. The hypervisor then allocates appropriate local drive definition and space on a new virtual drive of a local disk of the local machine. In this example, all content in the new virtual drive is initially empty. The hypervisor then defines the virtual machine, including a virtual disk configuration that is mapped to a remotely hosted virtual disk. The hypervisor then boots a new guest domain based on the virtual machine definition.

In this example method, for each sector read request, the hypervisor determines if the data sector already exists locally by checking a map of what data sectors have been previously copied locally. If the data sector does not exist, the hypervisor will query a network drive of a remote storage unit for that specific sector. The hypervisor will then write the sector locally. The hypervisor will then update a sector map of the local disk to indicate that the sector is now local. The hypervisor will then provide the content of the sector to the guest domain. For each sector write request, the hypervisor will apply the change to the locally defined disk as normal. The hypervisor will then update the sector map to indicate that the sector is now local. Once the guest domain is booted, the locally defined disk will be built/populated based on ongoing sector read and write requests.

In this example method, at initial boot, all disk reads will download sector data from the network and no more sector data is downloaded than what is minimally used to boot the guest domain (e.g., a disk that has 50 Gigabytes of data will only grow to enough size to support the guest OS boot as needed initially.) Such an implementation can, for example, be used to allow optimized fetching based on what is needed at that time and not based on random or sequential syncing.

In this example method, delays caused by booting from a network image will start out relatively high (e.g., initial boot and initial run) but as the OS-required files and the required files for frequently used applications are fetched locally, such delay introduced by the network is reduced and will eventually eliminated. For new apps and data that haven't already been fetched locally, there may be some delay spikes. However, once the disk is fully constructed, network connectivity will no longer be necessary.

Figure 4:
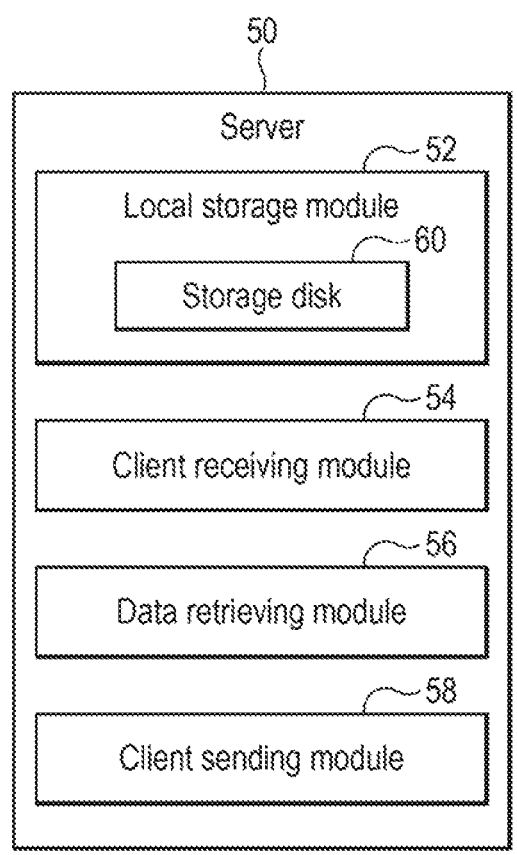
FIG. 4 illustrates a server that can enable a client system to boot from remote storage, according to an example.

FIG. 4 illustrates an example server 50 for use with a client system described herein. With reference to a client-server relationship, system 10 described above serves as a client relative to server 50. It is appreciated, however, that the various implementations of system 10 provided above are not intended to suggest specific requirements or functionality of server 50 or that a specific implementation of server 50 is required for operation of system 10. One or more aspects of system 10 or another system described herein (and vice-versa) can be implemented in server 10. As but one example, one or more aspects of processors or storage mediums described above with respect to system 10 can be incorporated in server 50.

As described herein, server 50 includes: (1) a local storage module 52 to locally store data to boot a VM application on a remote client, (2) a client receiving module 54 to receive a request for a subset of data to boot the VM application on the remote client, (3) a data retrieving module 56 to retrieve the requested subset of data from a local disk sector based on a remote disk sector address, and (4) a client sending module 58 to send, to the remote client, the requested subset of data retrieved from the local disk sector. Each module of system 50 will be described in further detail below.

Although the term "server" is used herein for convenience, it is appreciated that this term is intended to refer, to the temporary or permanent functionality of the device rather than the structure of the device. For example, as used herein the term "server" can refer to a stand-alone serve multi-purpose computer (e.g., a desktop personal computer, laptop, etc.), a virtual machine running on another machine, etc. It is further appreciated that in some implementations (or time periods), server 50 can act as both a server and a client to the client device and vice-versa.

As provided above, local storage module 52 is operative locally store data to boot a VM application on a remote client. In some implementations, local storage module 52 of server 50 includes a storage disk 60 to locally store the data to boot the VM application. It is appreciated that local storage module 52 of server 50 can incorporate one or more aspects of local storage module 52 of client system 10 described above.

As provided above, client receiving module 54 is operative to receive a request for a subset of data to boot the VM application on the remote dent. The referenced VM application can, for example, refer to any VM application described above with respect to FIG. 1. The received request can, for example, be received from remote client system 10 or another suitable source. In some implementations, the request can include a disk sector address for the subset of data. The disk sector address can, for example, identify a disk sector of a storage disk of remote client system 10 that is supposed to store the subset of data.

As provided above, data retrieving module 56 is operative to retrieve the requested subset of data from a local disk sector of server 50 based on a remote disk sector address of client system 10. In some implementations, there can be a 1:1 correlation between a disk sector address of a local storage disk of client system 10 and a disk sector address of local storage disk 60 of server 50. In such implementations, data retrieving module 56 can be operative to translate the disk sector address of a storage disk of remote client system 10 to a disk sector address of local storage disk 60 of server 50. In some implementations, there is not a 1:1 correlation between a disk sector address of a local storage disk of client system 10 and a disk sector address of local storage disk 60 of server 50. In such implementations, data retrieving module 56 can determine how to extract, isolate, or otherwise retrieve the requested subset of data from local storage disk 60 of server 50. In some implementations, data retrieving module 56 can incorporate one or more aspects of the disk image hosting server described above with respect to the example system of FIG. 1. For example, data retrieving module 56 can include a processor configured to dissect a hosted image and extract individual sectors of data based on a requested sector address.

As provided above, client sending module 58 is operative to send, to the remote client, the requested subset of data retrieved from the local disk sector. It is appreciated that client sending module 53 can send the requested subset of data to client system 10 as described herein with respect to download module 18. For example, in some implementations, client sending module 58 is to send the data using a network connection and in accordance with network protocols. It is appreciated that any suitable networking transmission protocol can be used by client sending module 58 to send data to client system 10. For example, in some implementations, client sending module 58 is to send data using TCP/IP protocols. In some implementations, client sending module 58 is to send data using FTP, SFTP, HTTP, BitTorrent, rsync, or another suitable protocol. In some implementations, client sending module 58 is to send data using a suitable UDP protocol.

Figure 5:
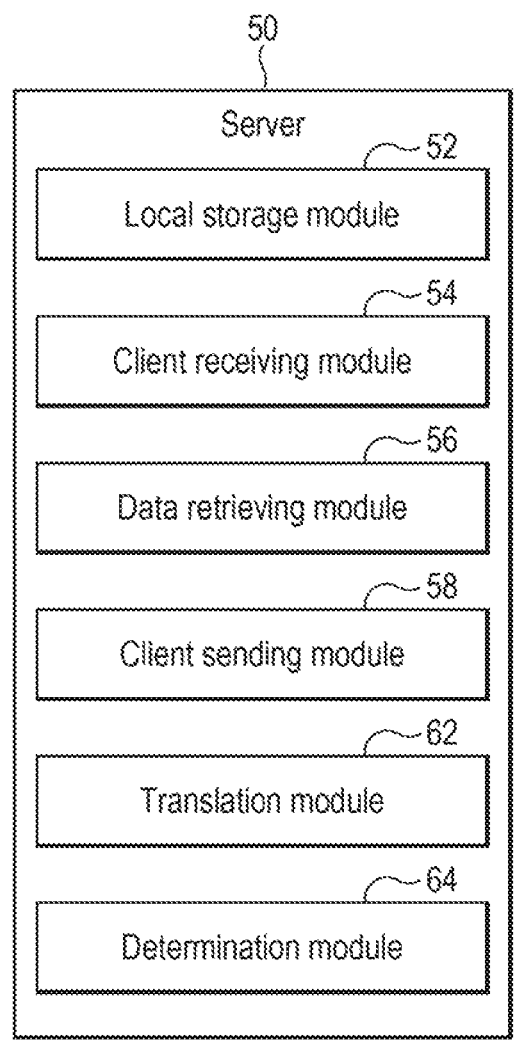
FIG. 5 illustrates a server that can enable a client system to boot from remote storage, according to another example.

FIG. 5 illustrates a server that includes additional aspects compared to the server illustrated in FIG. 4. For ease of illustration, the same reference number (server 50) is used to refer to both servers and common reference numbers, are used to refer to common modules (e.g., local storage module 52). The specific example provided below is not intended to suggest specific requirements or functionality of the server of FIG. 4 or that the server of FIG. 4 is incompatible with the additional aspects. Certain aspects of server 50 of FIG. 4, such as for example storage disk 60, are not depicted in server 50 of FIG. 5 to avoid redundancy. However, it is appreciated that one or more aspects of the example system of FIG. 4 described herein can be implemented in the system of FIG. 5 or another system described herein (and vice-versa).

Server 50 includes a translation module 62 to translate the disk sector address of the remote client storage disk to a disk sector address of local storage disk 60. With reference to the above description of data retrieving module 55. Translation module 62 can, for example, be used when there is a 1:1 correlation between a disk sector address of a local storage disk of client system 10 and a disk sector address of local storage disk 60 of server 50. For example, the translation module 62 can identify a disk, sector address of local storage disk 60 of server 50 that corresponds to the requested storage disk sector. Translation module 62 can further be used when there is not a 1:1 correlation between a disk sector address of a local storage disk of client system 10 and a disk sector address of local storage disk 60 of server 50. For example, the translation module 62 can identify multiple disk sector addresses of local storage disk 60 of server 50 that corresponds to a single requested storage disk sector.

Server 50 includes a determination module 64 to determine whether additional subsets of data should be provided to the remote client when a request for a subset of data is received by the server, the determination being based on the subset of data. For example, server 50 can also implement aspects of "smart fetching" functionality (described above with respect to disk access request module 14) to schedule transmission of additional data even if such data is not requested by client system 10. For example, server 50 can determine that, based on historical usage, a web browser will likely be opened during use of client system 10 and will be instructed to automatically transmit data for operation of the web browser in the background so that it is ready before an operate attempts to open the web browser. Such "smart fetching" can, for example, leverage information from a scheduler about load and connectivity to determine when is the best time to transmit data. In situations where determination module 64 determines that additional subsets of data should be provided to client system 10, client sending module 58 can send to client system 10 the requested subset of data along with the additional subsets of data determined by determination module 64.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As another example, functionalities discussed above in relation to specific modules or elements can be included at different modules, engines, or elements in other implementations.

As used herein, the term "provide" includes push mechanisms (e.g., sending data independent of a request for that data), pull mechanisms (e.g., delivering data in response to, a request for that data), and store mechanisms (e.g., storing data at an intermediary at which the data can be accessed). Furthermore, as used herein, the term "based on" means "based at least in part on." Thus, a feature that is described based on some cause, can be based only on the cause, or based on that cause and on one or more other causes.

Furthermore, it should be understood that the systems, apparatuses, and methods described herein can include various combinations and/or sub-combinations of the components and/or features of the different implementations described. Thus, features described with reference to one or more implementations can be combined with other implementations described herein.

What is claimed is:

1. A system comprising:
   a local storage module to locally store data of the system, the local storage module including a storage disk subdivided into disk sectors;
   a disk access request module to receive a disk read request for data to boot a virtual machine (VM) application, the disk read request identifying a disk sector address for a requested disk sector;
   a sector checking module to check whether the requested data is locally stored on the requested disk sector;
   a download module to download, from a remote storage unit, the requested data along with additional subsets of data in response to a determination that the requested data is not stored on the requested disk sector;
a sector storage module to store the downloaded requested data on the requested disk sector; and
a disk access response module to provide the requested data to the disk access request module,
wherein the sector checking module is to determine that the requested data is not stored on the requested disk sector if an error is detected in the requested data stored in the requested disk sector,
wherein the additional subsets of data are data which are not requested, and
wherein the additional subsets of data are determined based on historical usage in response to the requested data.

2. The system of claim 1, wherein the VM application is an operating system (OS).

3. The system of claim 1, further comprising:
a sector flagging module to flag the requested sector as storing the requested data after the requested data is stored on the requested disk sector,
wherein the sector checking module is to check whether the requested disk sector is flagged as storing the requested data.

4. The system of claim 3, wherein the sector flagging module is to flag, using a sector map, whether disk sectors on the storage disk store data to boot a VM application.

5. The system of claim 4, wherein the sector map is in the form of a bitmap index, and an initial bitmap index is to be provided to boot the VM application.

6. The system of claim 5, wherein the initial bitmap index is to indicate that no disk sectors on the storage disk store data to boot the VM application.

7. The system of claim 6, wherein the initial bitmap index indicates that certain disk sectors on the storage disk are assigned to store data to boot the VM application, the initial bitmap index being based on file system level knowledge.

8. The system of claim 1, wherein the disk access response module is to provide the requested data to the disk access request module without downloading the requested data in response to a determination by the sector checking module that the requested data is locally stored on the requested disk sector.

9. The system of claim 1, wherein the storage disk is subdivided into disk sectors of 512 bytes or 4096 bytes.

10. A method comprising:
determining whether a first subset of data to begin booting a computer program is stored on a first disk sector of a local storage disk of a computing device;
retrieving the first subset of data from a remote storage disk in response to determining that the first subset of data is not stored on the first disk sector of the local storage disk;
storing the retrieved first subset of data in the first disk sector of the local storage disk;
providing the retrieved first subset of data to a local processor of the computing device to begin booting the computer program;
after providing the retrieved first subset of data to the computer program, determining whether a second subset of data to continue booting the computer program is stored on a second disk sector of the local storage disk;
retrieving the second subset of data from a remote storage disk in response to determining that the second subset of data is not stored on the second disk sector of the local storage disk;
storing the retrieved second subset of data in the second disk sector of the local storage disk; and
providing the retrieved second subset of data to the computer program to continue booting the computer program,
wherein it is determined that that the first subset of data is not stored on the first disk sector if an error is detected in the first subset of data stored in the first disk sector, and
wherein the remote storage disk schedules transmitting additional subsets of data which are not requested but should be provided based on historical usage in response to retrieving the first or second subset of data from the remote storage disk.

11. The method of claim 10, wherein boot sectors continue to be retrieved and stored until the entire computer program is stored on the local storage disk.

12. The method of claim 10, wherein the first and second subset of data are retrieved using a network connection.

13. A server comprising:
a local storage module including a storage disk to locally store data to boot a Virtual Machine (VM) application on a remote client;
a client receiving module to receive, from the remote client, a request for a subset of data to boot the VM application on the remote client, the request including a disk sector address for the subset of data, the disk sector address identifying a disk sector of a storage disk of the remote client that is to store the subset of data;
a data retrieving module to retrieve the requested subset of data from a local disk sector based on the remote sector address;
a determination module to determine whether additional subsets of data which are not requested by the remote client should be provided based on historical usage to the remote client in response to the request for the subset of data, the determination being based on the subset of data; and
a client sending module to send, to the remote client, the requested subset of data retrieved from the local disk sector along with the additional subsets of data determined by the determination module, wherein the remote client provides the request for the subset of data if an error is detected in data stored at the disk sector of the remote client.

14. The server of claim 13, further comprising:
a translation module to translate the disk sector address of the remote client storage to a local disk sector address of the local storage disk.

* * * * *